Jan. 20, 1931.  E. C. BALLMAN  1,789,294
SELF STARTING ASYNCHRONOUS MOTOR
Filed Oct. 8, 1924
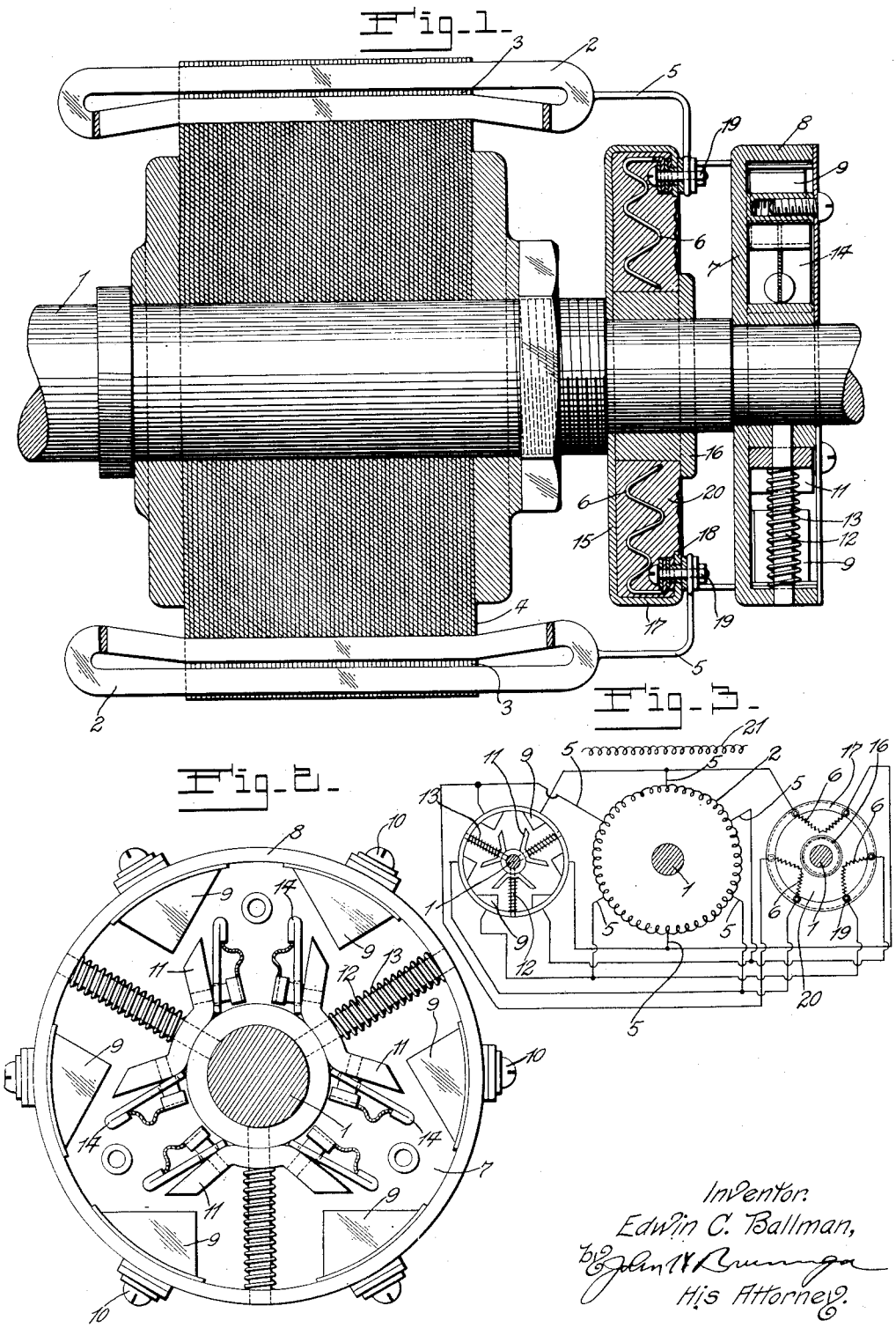
Inventor:
Edwin C. Ballman,
by John W. Brunaga
His Attorney.

Patented Jan. 20, 1931

1,789,294

UNITED STATES PATENT OFFICE

EDWIN C. BALLMAN, OF ST. LOUIS, MISSOURI

SELF-STARTING ASYNCHRONOUS MOTOR

Application filed October 8, 1924. Serial No. 742,894.

This invention relates to electric motors, and more particularly to asynchronous polyphase motors of the self-starting type.

It has long been the practice to start an ordinary polyphase motor having a distributed coil winding on the rotor by inserting a starting resistance in the rotor circuit so as to improve the starting torque and cut down the starting current, and to short circuit this resistance in one or more steps as the motor attains certain speeds. A common method of accomplishing this purpose is to mount the secondary resistance in a separate controller external to the motor connected to the rotor circuit through suitable slip rings. The controller is ordinarily devised so that it may be manipulated to cut in or out the resistance and thereby control the speed and torgue of the motor. In another common method the motor is made automatically self-starting by mounting the resistance on the rotor and providing automatic means for short circuiting the same as the motor attains speed.

In practically all of the methods at present in use, the rotor winding is of the two or three phase type or tapped at three equal equi-distant points, and the resistance is connected across the phases thus provided. In short circuiting the resistance and also the winding, the universal practice is to connect the corresponding points in the different phases to a common or "star" point. This is true both for the intermediate steps of the resistance and for finally short circuiting the winding. When the short circuit is made in this way, whether a two phase or a three phase arrangement of windings is used, the voltage short circuited is less than the full or maximum rotor voltage. Consequently with a given horse power load, a correspondingly increased current must be short circuited in comparison with the current which would be handled if the maximum rotor voltage were short circuited. This means that the switching devices must handle heavier currents than would be required if the maximum rotor voltage were short circuited and these currents increase as the voltage short circuited decreases, or in other words as the taps on the winding are brought closer together.

One of the objects of this invention, therefore, is to provide a self-starting asynchronous motor in which the currents to be handled by the switching device are reduced to a minimum.

The starting of a motor of this type always involves the dissipation of a certain amount of energy in heat. If this heat is permitted to be dissipated within the rotor winding, it causes a dangerous rise of temperature in that winding which is liable to cause injury to the insulation thereof. For this reason it is desirable to dissipate this energy in a resistance external to the winding and in many cases, this resistance is placed entirely external to the motor itself. Even when a resistance is used which is mounted on the rotor, the dissipation of a considerable amount of heat therein may cause an excessive rise of temperature of such resistance which may itself be a source of danger to the motor windings.

Another object of this invention, therefore, is to provide a starting resistance which may be mounted on the rotor and which is constructed to have an increased heat storage capacity adapted to prevent a dangerous rise of temperature.

Another object of this invention is to provide means for short circuiting the rotor winding at appropriate points in a plurality of separate circuits and adapted to maintain these circuits independent of each other.

Further objects will appear from the detail description taken in connection with the accompanying drawing, in which:

Figure 1 is a fragmentary sectional view of the rotor of a motor embodying this invention;

Figure 2 is a detail of the short circuiting switch; and

Figure 3 is a diagram showing the circuit connections.

Referring to the accompanying drawing, 1 designates the shaft of an asynchronous induction motor which may have the ordinary stator construction and primary winding of any type of polyphase induction motor. 2 designates the secondary winding, which in the present instance is of the closed circuit type, such as is ordinarily used on direct current armatures which are connected to a commutator. In the present instance, however, since no commutator is required, no such connections are shown. The winding 2 may be imbedded in slots 3 in the core 4 as is usual in induction motor practice and under normal operating conditions carries the induced secondary currents and voltages in the usual manner for asynchronous induction motors. The winding 2 is in accordance with this invention, provided with taps 5 which enter the winding 2 at spaced points. The taps 5 are arranged in pairs, the taps of each pair being spaced 180 electrical degrees from each other. At the same time the pairs are uniformly spaced from one another as illustrated in Figure 3. Each pair of taps 5 is connected to a resistance unit 6, there being in the case illustrated three such units since there are three pairs of taps. Each unit 6, therefore, is connected to points in the winding 180 electrical degrees apart. It will be noted that each unit 6 is in a separate circuit and that these circuits are not connected together at any point as is the common practice in connecting a polyphase rotor winding to a common or "star" point.

A centrifugal short circuiting switch is provided comprising a support 7 mounted on the shaft 1 and having an annular rim 8 on which are mounted but insulated therefrom a series of contacts 9. Each contact is provided with a screw 10 or other suitable connecting means whereby a circuit conductor may be connected to the contact while being insulated from all other parts of the mechanism. The contacts 9 are arranged in pairs around the rim 8 and between the contacts of each pair is arranged a radially sliding bridging contact 11. Each contact 11 is mounted on a radial guide rod 12 which is surrounded by a restraining spring 13 which bears against the contact 11 and the rim 8 and serves to yieldingly retain the contact 11 in its innermost or open circuit position. When this device rotates with the rotor and a sufficient speed is obtained, centrifugal force acting on the contacts 11 will cause the same to move outwardly along the guide-rod 12 and against the tension of the spring 13 so as to make bridging contact between a pair of contacts 9. There are three sets of contacts 9 and 11 so as to take care of the present arrangement of three pairs of taps 5. Each contact 11 carries a pair of make and break contacts 14. This switch may be in all respects the same as that described in application Serial Number 589,725, filed September 21, 1922.

The resistance units 6 may be mounted in a support 15 having a hub 16 suitable for mounting on the shaft 1. The support 15 is circular in form and provided with a rim 17 having an in-turned flange 18. The resistance units 6 are connected to insulated terminals 19 which may be mounted at suitable points on the support 15. In order to provide good mechanical support for the units 6 and also so as to provide means in contact with the resistances for carrying off heat therefrom, these units may be imbedded in a suitable cement 20 which is packed into the support 15 and around the resistance units and is held in place by the rim 17 and the flange 18. This cement is closely packed around each unit so as to make good thermal contact therewith and at the same time good rigid mechanical support thereto. This cement may be of any suitable type of which there are a good many available, and being in close contact with the resistances will serve to carry heat therefrom and will, therefore, provide additional heat storage capacity. Therefore, some of the heat dissipated in the resistances will find its way into the body of cement 20, thereby relieving the resistance units thereof and preventing the dangerous rise of temperature.

In practice this device may be connected as illustrated in Figure 3. Each pair of taps 5 is connected to a resistance unit 6 and also to a pair of contacts 9 which are bridged by a contact 11. Thus each pair of taps 5 has a resistance unit connected thereto at starting which is adapted to be short circuited by the contact 11 when a predetermined speed has been attained.

In starting, the currents induced in the rotor winding 2 by excitation of the stator winding 21 will find a short circuiting path at each pair of taps 5 through a resistance unit 6. Each pair of taps will find an independent circuit through such a resistance unit. The three circuits will be entirely separate during the starting period. The current handled by the resistance units 6 will, therefore, be that corresponding to a pair of taps 5 which are positioned 180 electrical degrees apart, or so as to short circuit the maximum rotor voltage. Consequently a minimum current will have to be handled by each resistance unit for a given load. This current will dissipate its energy in heat in the resistance and part of this heat will be drawn away from the resistance unit by the cement packing 20. Consequently the temperature rise of the resistance may be kept down to a safe value. When the rotor has attained the required speed, the centrifugal switch will operate to short circuit each resistance unit and, therefore, the whole winding. This puts the rotor in running condition for normal operation, the winding 2 providing the normal secondary winding for full-speed operation.

It will be seen that this invention provides means for operating a polyphase induction motor which may be made automatically self-starting and in which the starting resistance may be mounted directly on the rotor in compact form and in a convenient place. The construction provides not only a rigid mounting so as to get good mechanical support to the resistance conductors, but also provides an additional heat storage capacity to prevent a dangerous rise of the temperature. The taps of the normally secondary winding on the rotor are arranged and connected to the resistances in such a way that the currents which must be handled in each resistance unit are reduced to a minimum and, therefore, the size and expense of the resistances themselves are reduced to a minimum.

It is obvious that various changes may be made in details of construction without departing from the spirit of this invention; it is, therefore, to be understood that this invention is not to be limited to the specific details shown and described.

Having thus described the invention, what is claimed is:

1. The method of operating an induction motor which carries a load at asynchronous speed, comprising, producing a primary flux which revolves with respect to the primary, causing the primary flux to induce torque-producing ampere-turns in a closed-circuit winding on the secondary, connecting at starting a plurality of separate resistances in the secondary circuit respectively at a series of pairs of points on said winding with each pair spaced substantially 180 electrical degrees in order to impress on each resistance the maximum induced E. M. F., and short circuiting the resistances at operating speed in order to cause the motor to operate by the interaction of the primary field with the currents induced thereby in the secondary circuit.

2. An asynchronous polyphase induction motor, comprising, a polyphase primary inducing winding, a closed-circuit secondary induced winding, a series of separate starting resistances, means for connecting said resistances to pairs of points on said secondary winding, each pair of points being spaced substantially 180 electrical degrees, and means for short circuiting said resistances when the motor reaches operating speed in order to cause the motor to operate by the interaction of the primary field with the currents induced thereby in the secondary winding.

In testimony whereof I affix my signature this 5th day of Sept., 1924.

EDWIN C. BALLMAN.